United States Patent
Cerda et al.

(10) Patent No.: US 7,595,953 B1
(45) Date of Patent: Sep. 29, 2009

(54) MAGNETIC RECORDING DISK DRIVE WITH SWITCHABLE COMPENSATION FOR MECHANICAL AND ELECTRICAL DISTURBANCES

(75) Inventors: Adrian E. Cerda, San Jose, CA (US); Amir Hossein Chaghajerdi, San Jose, CA (US); Bryan Scott Rowan, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 12/177,571

(22) Filed: Jul. 22, 2008

(51) Int. Cl.
*G11B 5/596* (2006.01)
(52) U.S. Cl. .................................... 360/77.04
(58) Field of Classification Search ........................ None
See application file for complete search history.

(56) References Cited

U.S. PATENT DOCUMENTS

| | | | |
|---|---|---|---|
| 5,369,345 A | 11/1994 | Phan et al. | |
| 5,459,383 A * | 10/1995 | Sidman et al. | 318/611 |
| 5,663,847 A | 9/1997 | Abramovitch | |
| 5,677,809 A | 10/1997 | Kadlec | |
| 6,414,813 B2 | 7/2002 | Cvancara | |
| 7,035,034 B2 | 4/2006 | Semba et al. | |
| 7,177,113 B1 | 2/2007 | Semba et al. | |
| 7,206,162 B2 | 4/2007 | Semba et al. | |
| 7,268,968 B2 | 9/2007 | Semba et al. | |

2008/0123480 A1  5/2008  Kim et al.

OTHER PUBLICATIONS

Jinjenzi et al., "Acceleration Feedforward Control Against Rotational Disturbance in Hard Disk Drives," IEEE Transactions on Magnetics, vol. 37, No. 2, Mar. 2001, pp. 888-893.
White et al., "Increased Disturbance Rejection in Magnetic Disk Drives by Acceleration Feedforward Control," Proceedings of the 13th Triennial IFAC World Congress, Jun. 30-Jul. 5, 1996, San Francisco, CA, pp. 489-494.
Atsumi et al., "Vibration Suppression Beyond Nyquist Frequency in Hard Disk Drives", Proceedings of the 2006 IEEE International Conference on Control Applications, Munich, Germany, Oct. 4-6, 2006, pp. 1109-1114.

* cited by examiner

*Primary Examiner*—K. Wong
(74) *Attorney, Agent, or Firm*—Thomas R. Berthold

(57) ABSTRACT

A magnetic recording disk drive has compensation for both mechanical disturbances and electrical disturbances. The disk drive's servo control system includes mechanical disturbance (MD) feedforward compensation and electrical disturbance (ED) feedforward compensation, of which either or both can be selectively enabled and disabled. In the operation of the disk drive, it is first determined that there is some disturbance that is causing track misregistration (TMR). The system is then tested to determine if the ED is greater than an ED threshold by measuring an averaged ED sensor signal. If ED is greater than the ED threshold, the system is then tested for a reduction in TMR by selectively turning MD compensation and ED compensation on and off, and determining changes in the position error signal (PES). Depending on the test results from the PES measurements, one or both of MD compensation and ED compensation is left on, and maintained on until the TMR falls below the predetermined threshold.

11 Claims, 5 Drawing Sheets

MAGNETIC RECORDING DISK DRIVE WITH SWITCHABLE COMPENSATION FOR MECHANICAL AND ELECTRICAL DISTURBANCES

BACKGROUND OF THE INVENTION

1. Field of the Invention

This invention relates generally to magnetic recording disk drives, and more particularly to a disk drive that includes a head-positioning servo control system that has compensation for generally high-frequency mechanical and electrical disturbances.

2. Description of the Related Art

Magnetic recording hard disk drives use an actuator, typically a rotary voice-coil-motor (VCM) actuator, for positioning the read/write heads on the data tracks of the recording disks. The disk drive has a servo control system that receives a position error signal (PES) from servo positioning information read by the heads from the data tracks and generates a VCM control signal to maintain the heads on track and move them to the desired track for reading and writing of data.

The servo control system is designed for optimal response to generally low-frequency mechanical disturbances. However, disk drives may experience high-frequency mechanical and electrical disturbances to which the servo control system cannot adequately respond. Also, the servo control system may detect such a high-frequency mechanical disturbance (MD) or electrical disturbance (ED) and respond as if it were a low-frequency disturbance, a problem referred to as "aliasing".

A typical MD that occurs at a frequency outside the design range of the servo control system is rotational vibration (RV). RV may arise internally, such as from motion of the VCM actuator, or externally, such as from shocks to the frame supporting the disk drive or from the movement of other disk drives when the drives are mounted together in a disk array system. RV compensation is a method that uses sensors (typically accelerometers) to detect RV and improve the PES by canceling the off-track motion induced by the RV. The RV sensor signal is input to a RV feedforward controller that creates a RV feedforward compensation signal that is summed with the control signal to the VCM actuator. The use of a RV sensor and feedforward compensation is described by Jinzenji et al., "Acceleration Feedforward Control Against Rotational Disturbance in Hard Disk Drives," *IEEE Transactions on Magnetics*, Vol. 37, No. 2, March 2001, pp. 888-893; and M. T. White et al., "Increased Disturbance Rejection in Magnetic Disk Drives by Acceleration Feedforward Control," *Proceedings of the 13th Triennial IFAC World Congress, Jun.* 30-Jul. 5, 1996, San Francisco, Calif., pp. 489-494.

However, the RV sensor output may include noise not related to RV. The source of noise may be electrical or sensor-related, such as non-rotational vibrations detected by the sensor's cross-axis sensitivity, and/or spurious signals generated as a result of physical distortion of the sensor itself. Thus if the RV compensation is enabled when the disk drive is not being subjected to RV disturbances, the servo control system performance may be degraded.

A typical ED that occurs at a frequency outside the design range of the servo control system is noise in the power supply voltage applied to the VCM driver that sends control current to the VCM actuator. This noise, typically a ripple voltage of the nominal power supply voltage, will cause the VCM driver to generate a control current with noise, resulting in undesirable mechanical movement of the VCM actuator. Pending application Ser. No. 12/036,478, filed Feb. 25, 2008 and assigned to the same assignee of this application, describes a disk drive with ED feedforward compensation for an ED to the VCM driver from power supply voltage noise. However, if this ED compensation is enabled when the disk drive is not subjected to noise from the power supply voltage, or the signal is an aliased version of an existing high-frequency noise due to the lack of a pre-designed or correct anti-aliasing filter, the servo control system performance may be degraded.

An additional problem has been discovered if both an MD in the form of RV, and an ED in the form of power supply voltage noise, are present simultaneously. Specifically, the movement of the VCM actuator and/or direct coupling into the RV sensor system induced by power supply voltage noise can cause the RV sensor to erroneously sense RV. This causes the RV feedforward compensation to inject noise into the servo control system.

What is needed is a disk drive that has compensation for both mechanical and electrical high-frequency disturbances outside the design range of the servo control system, but wherein either or both of the MD and ED compensations can be disabled when not needed.

SUMMARY OF THE INVENTION

The invention relates to a magnetic recording disk drive that has compensation for both mechanical disturbances and electrical disturbances. The disk drive's servo control system includes mechanical disturbance (MD) feedforward compensation and electrical disturbance (ED) feedforward compensation, of which either or both can be selectively enabled and disabled. The MD may be a rotational vibration (RV) disturbance, in which case the disk drive will include an RV sensor and RV feedforward compensation.

In the operation of the disk drive, it is first determined that there is some disturbance that is causing track misregistration (TMR). The TMR can be tested by calculating the frequency of recent write-inhibits, as compared against a write-inhibit frequency (WIF) threshold. The WIF threshold may be a predetermined number of write-inhibit flags per write commands. The system is then tested to determine if the ED is greater than an ED threshold by measuring an averaged ED sensor signal. If ED is greater than the threshold, the system is then tested for a reduction in TMR by selectively turning RV compensation and ED compensation on and off, and determining changes in the position error signal (PES). Depending on the test results from PES measurements one or both of RV compensation and ED compensation is left on, and maintained on until the TMR falls below the predetermined threshold. In the preferred embodiment, only if there is no ED greater than the ED threshold is the RV compensation turned on. This avoids the problem of coupling of the ED disturbance into the RV sensor. Since there is no ED disturbance, the RV compensation responds to actual RV sensed by the RV sensor.

In the preferred method of operation, the method is initiated by periodically testing the WIF. However, the method may also be initiated on a regularly scheduled basis instead of or in addition to testing the WIF. For example, the method may be initiated as a scheduled task each time the disk drive is powered on and/or each time the disk drive enters an idle state, i.e., a period during which the hard disk controller (HDC) is not processing read or write commands from the host.

For a fuller understanding of the nature and advantages of the present invention, reference should be made to the following detailed description taken together with the accompanying figures.

DETAILED DESCRIPTION OF THE INVENTION

Figure 1:
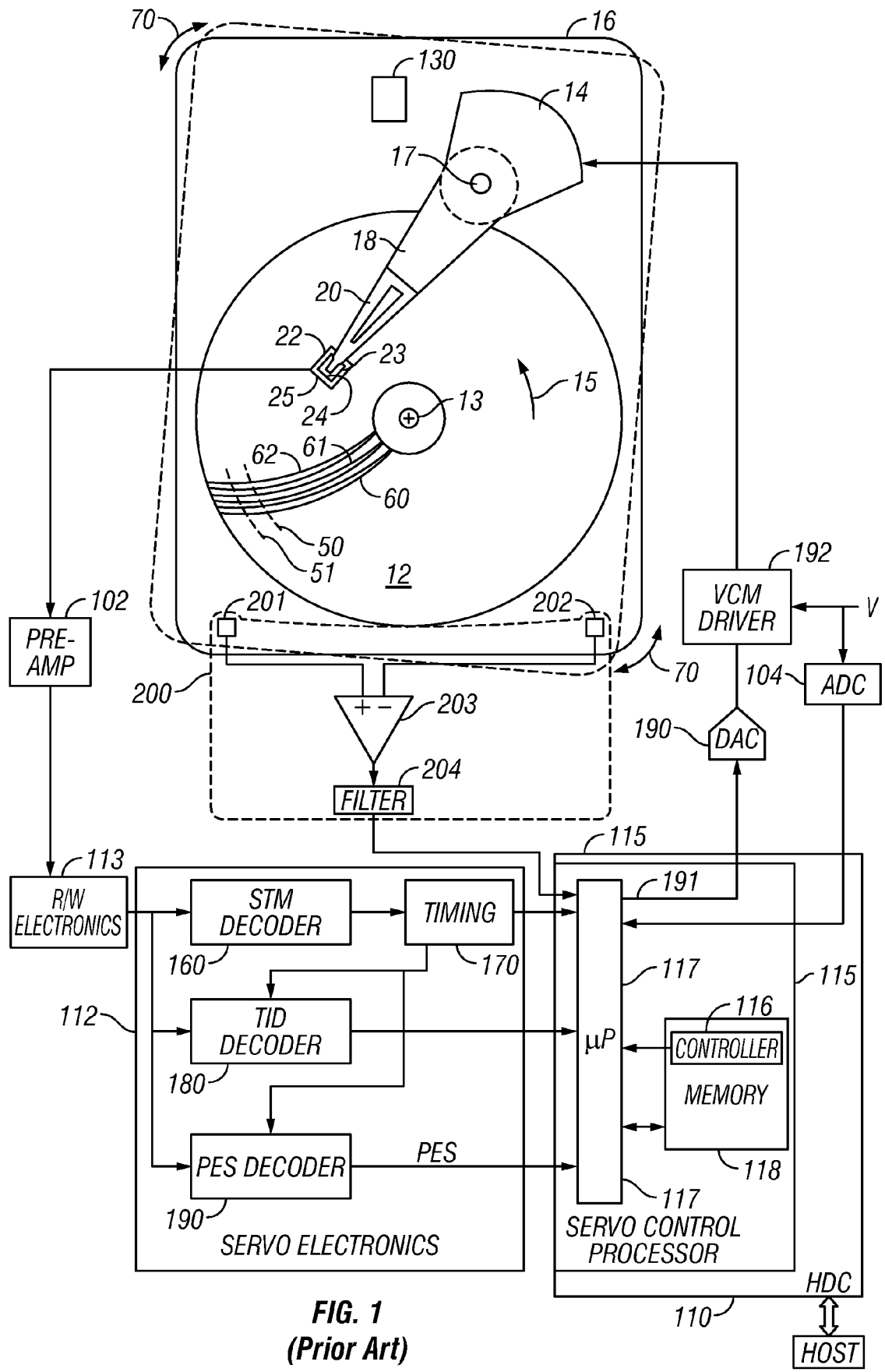
FIG. 1 is a schematic top view of a magnetic recording hard disk drive with a rotational vibration (RV) sensor and RV feedforward compensation and with an electrical disturbance (ED) sensor and ED feedforward compensation according to the invention.

FIG. 1 is a block diagram of a magnetic recording hard disk drive according to the invention. The disk drive includes a magnetic recording disk 12 that is rotated about an axis of rotation 13 in direction 15 by a spindle motor (not shown) mounted to the disk drive housing or base 16. The disk 12 has a magnetic recording layer patterned into magnetizable blocks that define concentric data tracks, such as typical tracks 50, 51, and servo sectors, such as typical servo sectors 60, 61, 62. The servo sectors extend generally radially across the concentric data tracks so that each data track has a plurality of equally-angularly spaced servo sectors that extend around the track. Each of the servo sectors in a data track contains a servo timing mark (STM), also called a servo address mark (SAM), that indicates the start of the servo sector, a track identification (TID) code, and a portion of a pattern of magnetized blocks or high-frequency bursts that are decoded to provide a head position error signal (PES).

The disk drive also includes a rotary voice coil motor (VCM) actuator 14 supported on the base 16. The actuator 14 pivots about axis 17 and includes a rigid actuator arm 18. A generally flexible suspension 20 includes a flexure element 23 and is attached to the end of arm 18. A head carrier or air-bearing slider 22 is attached to the flexure 23. A magnetic recording read/write (R/W) head 24 is formed on the trailing surface 25 of slider 22. The flexure 23 and suspension 20 enable the slider to "pitch" and "roll" on an air-bearing generated by the rotating disk 12.

As the disk 12 rotates in the direction 15, the positioning information in the servo sectors is read by the read head, amplified at pre-amplifier 102 and sent to R/W electronics 113. The servo electronics 112 receives input from R/W electronics 113 and provides digital signals to servo control processor 115. The servo control processor 115 includes a microprocessor 117, associated memory 118 and a control algorithm or controller 116, and provides a digital VCM control signal 191 to a digital-to-analog converter (DAC) 190. The output of DAC 190 is input to VCM driver 192. VCM driver 192 operates as a transconductance amplifier that is controlled in part by a reference voltage related to the voltage V from the disk drive's power supply voltage (not shown). VCM driver 192 controls current to the VCM 14 to move the read/write head 24 to the desired data track and maintain it on track for reading and writing of data.

Within the servo electronics 112, the STM decoder 160 receives a clocked data stream from the read/write electronics 113. Once an STM has been detected, an STM found signal is generated. The STM found signal is used to adjust timing circuit 170, which controls the operating sequence for the remainder of the servo sector. After detection of an STM, the track identification (TID) decoder 180 receives timing information from timing circuit 170, reads the clocked data stream, which is typically Gray-code encoded, and then passes the decoded TID information to servo control processor 115. Subsequently, the PES decoder 190 (also called the servo demodulator) captures the position information from R/W electronics 113 and passes a position error signal (PES) to servo control processor 115.

The servo control processor 115 includes a microprocessor 117 that uses the PES as input to a control algorithm to generate the digital control signal 191 to VCM driver 192. The control algorithm recalls from memory 118 a "controller" 116, which is a set of parameters based on the static and dynamic characteristics of the "plant" being controlled, i.e., the VCM 14. The control algorithm is essentially a matrix multiplication algorithm, and the controller parameters are coefficients used in the multiplication and stored in memory 118 accessible by the microprocessor 117, as is well known in the art.

The servo control processor 115 is depicted as part of the hard disk controller (HDC) 110. The HDC 110 performs many of the disk drive's functions, including passing of read/write commands from the host computer to the R/W electronics 113 and passing of data back to the host. Disk drives typically monitor commands to write data and inhibit writing if there is track misregistration (TMR), i.e., if the PES is too large (greater than some predetermined threshold). When this occurs the servo control processor 115 triggers a status bit or flag that represents a write fault or write inhibit and records this event in memory 118.

Disk drives experience mechanical disturbance (MD) forces during normal operation. These disturbances arise internally, such as from motion of the VCM actuator, as well as externally, such as from shocks to the frame supporting the disk drive or from the movement of other disk drives when the drives are mounted together in a disk array system. These MDs are typically linear or rotational vibration disturbances that cause track misregistration (TMR) of the read/write heads. In the present invention the disk drive detects MDs with an MD sensor, determines if there is potential TMR, and then enables or disables MD compensation of the VCM control signal 191 as necessary. In FIG. 1, the disk drive is illustrated as being subjected to rotation vibration (RV), but the invention is applicable to other types of MDs. In FIG. 1, RV sensor 200 detects rotational disturbances. RV sensor 200 is preferably a rotational accelerometer, shown as two linear accelerometers 201, 202, each attached to a respective side of base 16. The linear accelerometers 201, 202 are commercially available single-axis piezoelectric accelerometers, such as Murata Model PKGS-00LD accelerometers. The accelerometer is shown schematically as being attached directly to the base 16, but it may also be attached to a printed circuit board or card (not shown) that contains the disk drive electronics, which is secured to the base 16. The rotational accelerometer may also be a single-piece angular accelerometer. Other types of rotational accelerometers are commercially available from STMicroelectronics and Delphi.

The difference in output of the two linear accelerometers 201, 202 is summed at differential amplifier 203, so that together the linear accelerometers and the differential amplifier 203 function as a rotational accelerometer. The output of differential amplifier 203 is passed through a conditioning filter 204 and then to microprocessor 117 in the servo control processor 115. The servo control processor 115 uses the signal from RV sensor 200 to cancel the off-track motion induced by rotational vibration through a feedforward control method that creates an MD compensation signal that is used to provide the digital control signal input 191 to the VCM driver 192. The RV feedforward controller is calculated by the microprocessor 117 using parameters and program instructions stored in memory 118. It is also well known in the art that the RV feedforward controller may be implemented with analog circuitry that converts the signal from the RV sensor 200 to the MD compensation signal, with the MD compensation signal then being summed with the control signal to the VCM driver 192 after the servo control processor has calculated the control signal. U.S. Pat. No. 5,663,847 describes a disk drive with a RV sensor and a feedforward controller whose gain is adapted to accommodate changes in RV sensor sensitivity, and a threshold detector for turning off the adaptive gain feature. U.S. Pat. No. 6,414,813 B2 describes a disk drive with a RV sensor and a feedforward controller with multiple sets of adjustable gains, where a gain set is selected if the RV sensor output and the PES exceed certain thresholds. U.S. Pat. No. 7,177,113 B1 describes a disk drive with switchable RV cancellation.

Disk drives also experience electrical disturbance (ED) forces during normal operation. A common source of ED is caused by noise, typically represented as a ripple voltage, from the power supply. This ED is reflected as noise in the reference voltage $V_R$ used by VCM driver 192, which is then reflected as noise on the current applied to VCM 14 by VCM driver 192. In the present invention the disk drive detects EDs with an ED sensor, determines if there is potential TMR, and then enables or disables ED compensation of the VCM control signal 191 as necessary. In FIG. 1, the disk drive is illustrated as being subjected to an ED on the voltage reference applied to VCM driver 192, but the invention is applicable to other types of EDs. The reference voltage $V_R$ applied to the VCM driver 192 is directly related to the power supply voltage V and either it or the power supply voltage is monitored and output in digital form by analog-to-digital converter (ADC) 104 to microprocessor 117 of the servo control processor 115. The servo control processor 115 uses the signal from ADC 104 to cancel the off-track motion induced by the ED through a feedforward control method that creates an ED compensation signal that is used to provide the digital control signal input 191 to the VCM driver 192. The ED feedforward controller is calculated by the microprocessor 117 using parameters and program instructions stored in memory 118. It is also well known in the art that the ED feedforward controller may be implemented with analog circuitry that converts the signal from ADC 104 to the ED compensation signal, with the ED compensation signal then being summed with the control signal to the VCM driver 192 after the servo control processor has calculated the control signal.

Figure 2:
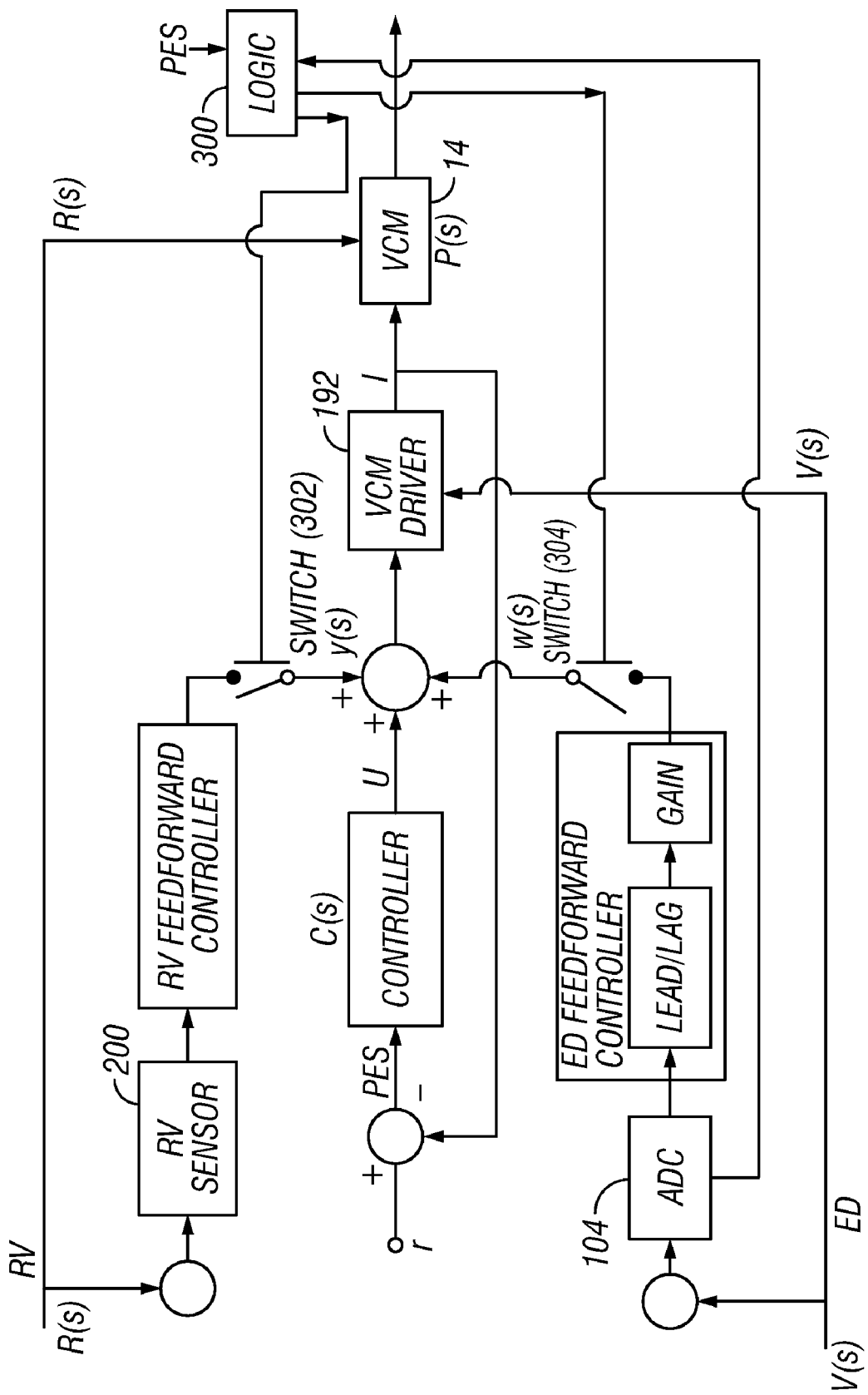
FIG. 2 is generalized version of the control system loop for the system of FIG. 1.

FIG. 2 is a generalized depiction of the control system loop of the present invention. The reference position of the head during track following is represented as input "r". P(s) is the VCM actuator or "plant" transfer function, where s is the Laplace transform variable. This transfer function is known from modeling (e.g., finite element modeling) during the disk drive design process, verified through standard frequency response measurement techniques during the disk drive testing process, and can be tested on each individual disk drive during manufacturing or recalibration operations. C(s) represents the VCM feedback controller transfer function, which is determined during the disk drive design process. It can also be verified through standard frequency response measurement techniques during testing process, and can also be tested on each individual disk drive during manufacturing or recalibration operations.

The rotational vibration R(s) affects the disk drive dynamics and thus creates a MD to the VCM 14. However, the RV sensor 200 detects the rotational vibration and the RV feedforward controller compensates for the MD by generating a compensation signal y(s) that is summed with the VCM control signal u(s) from the VCM controller. The RV feedforward controller may be implemented in analog circuitry or calculated by the servo control processor.

The power supply voltage, represented as V(s), creates an ED to the VCM driver 192 that affects the VCM driver's reference voltage $V_R$, which it turn affects the VCM actuator 14. However, the ADC 104 detects the ED of the power supply voltage and the ED feedforward controller compensates for the ED by generating a compensation signal w(s) that is summed with the VCM control signal u(s) from the VCM controller. The ED feedforward controller may be implemented in analog circuitry or calculated by the servo control processor. The ED feedforward controller includes a conventional lead-lag filter that filters the frequency content of the disturbance and provides an output to gain compensation. The parameters of the ED feedforward controller are calculated in the conventional manner of control system design by measuring the response of the transconductance amplifier in VCM driver 192 to the power supply voltage.

Figure 3:
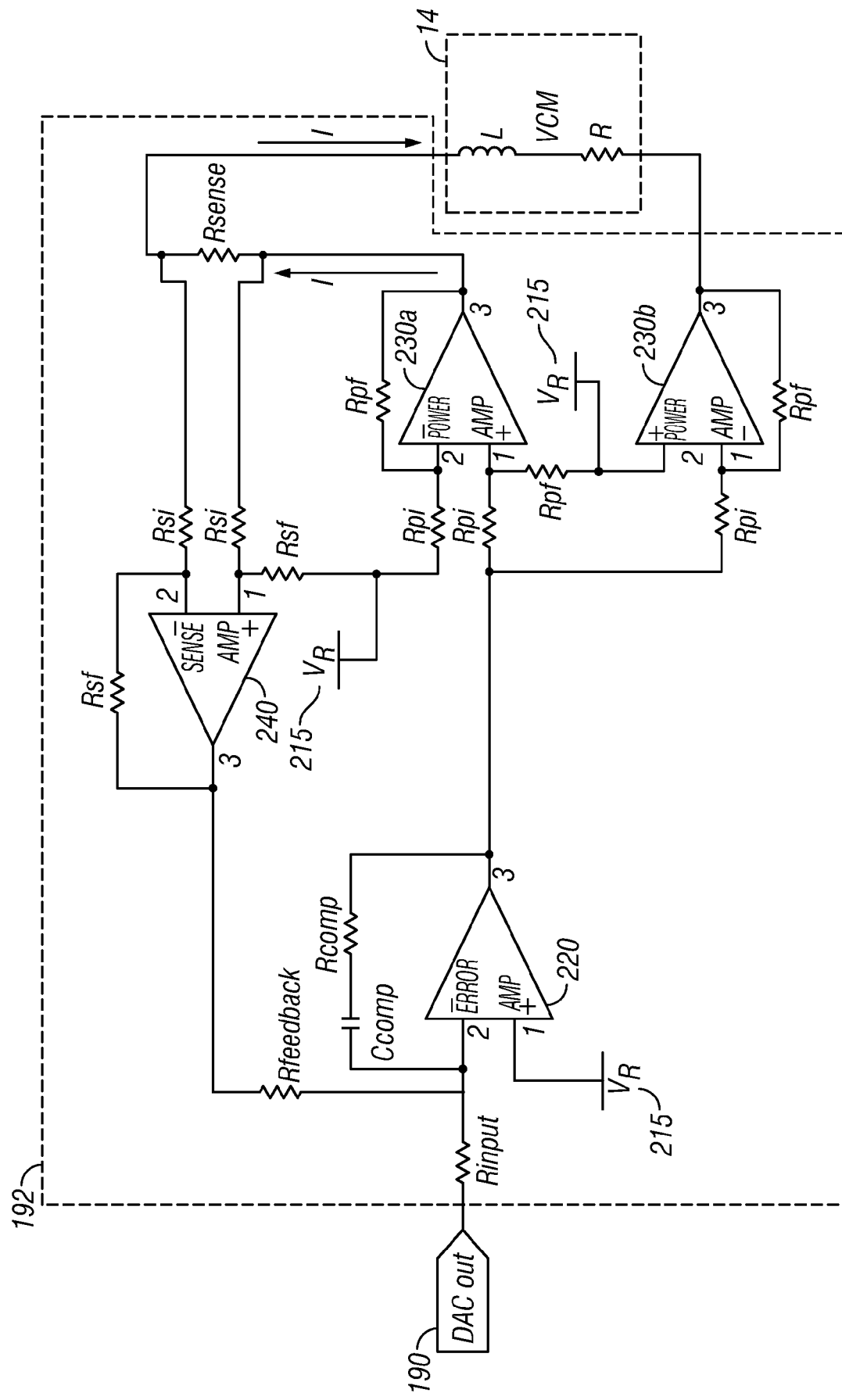
FIG. 3 is a schematic of the VCM driver, which can be considered a transconductance ($G_m$) amplifier.

FIG. 3 is a schematic of VCM driver 192, which can be considered a transconductance ($G_m$) amplifier 192. $G_m$ amplifier 192 provides a current I that is proportional to a voltage that it receives. $G_m$ amplifier 192 is commonly used in control systems for controlling an apparatus such as VCM 14. DAC 190 converts a digital voltage of a control command 191 to an analog voltage of a control command, and presents it to $G_m$ amplifier 192 for processing. Inherent in $G_m$ amplifier 192 is a voltage reference $V_R$ 215 which provides at least one reference voltage to error amplifier 220, power amplifier (230a, 230b), and/or current sensing amplifier 240. $V_R$ 215 is typically half of the voltage V delivered by the power supply. Since $V_R$ 215 is electrically coupled with the power supply voltage, the performance of error amplifier 220, power amplifier (230a, 230b), and current sensing amplifier 240 is affected by a disturbance in the power supply voltage. Associated with each amplifier is an array of electrical components. For example, associated with sensing amplifier 240 are sense feedback resistors Rsf, and sense input resistors Rsi. There are similarly associated components for error amplifier 220 and power amplifier (230a, 230b). Each of these components has its own inherent performance or tolerance for its expected electrical parameter. In turn, the tolerance of each electrical component affects the performance of the associated amplifiers, and the performance of $G_m$ amplifier 192. The performance of $G_m$ amplifier 192 has specified tolerances.

With reference to FIG. 2, the relational equations which link elements of the servo control loop are expressed include elements defined as follows: PES is position error signal; r is the reference position; $G_m$ is the transconductance gain which translates from voltage input to current output from transconductance amplifier 192; I is VCM current; B is a mechanical bias; U is the control command; ED is the electrical disturbance; and V is the input voltage from the power supply.

Under closed servo loop control, when PES=0 during tracking, the VCM is compensating for mechanical bias B. There is no motion of VCM and therefore $$I+B=0 \qquad (1)$$

The relationship of VCM current to transconductance amplifier output, disturbance and control command is $$I=Gm \times (ED+U). \qquad (2)$$

Substituting equation (2) into equation (1) presents $$(G_m \times (ED+U)) + B = 0 \quad (3)$$

during tracking on reference position r.

Figure 4:
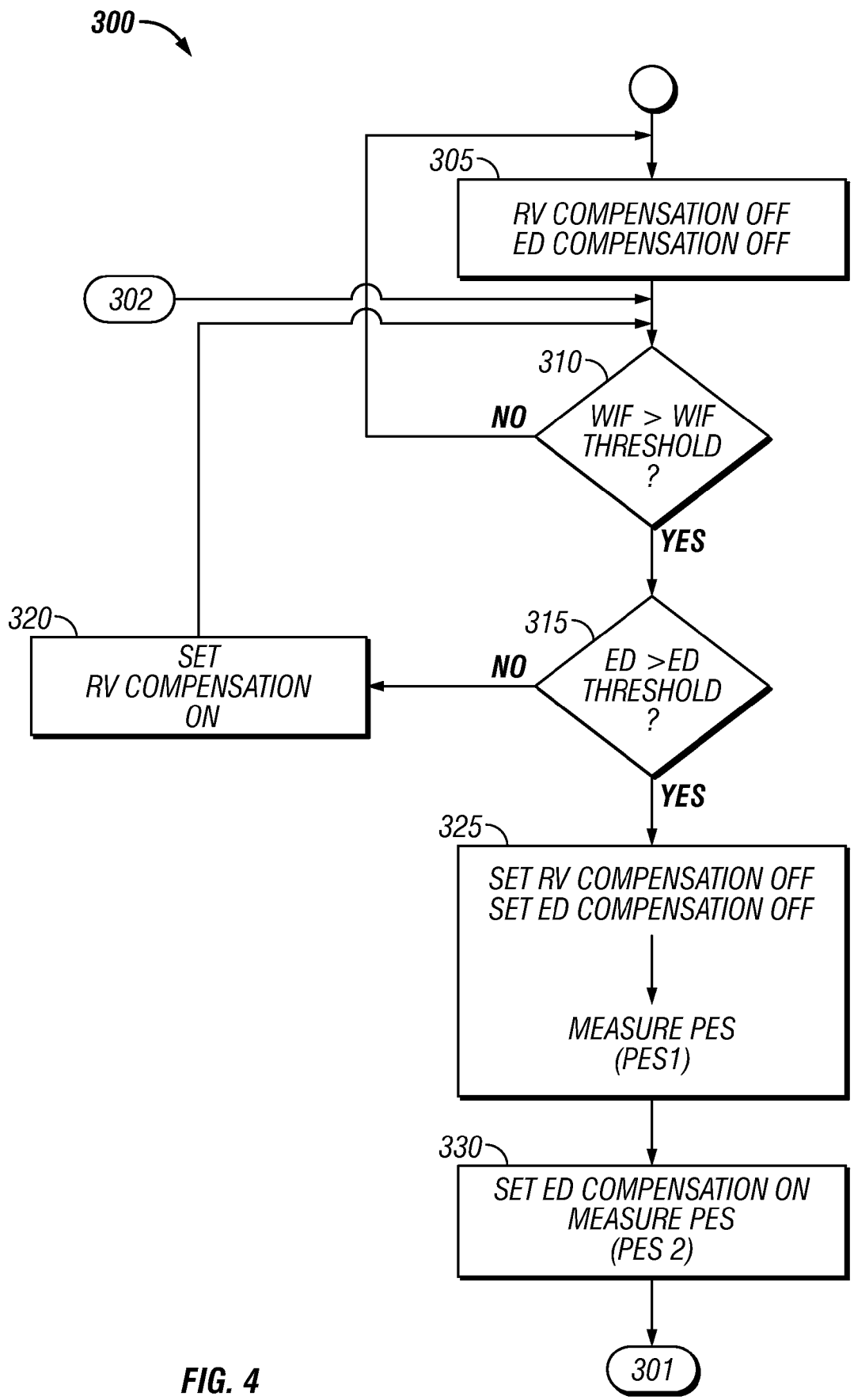
FIG. 4 is a flow chart of the logic representing the method of the invention.
Figure 4:
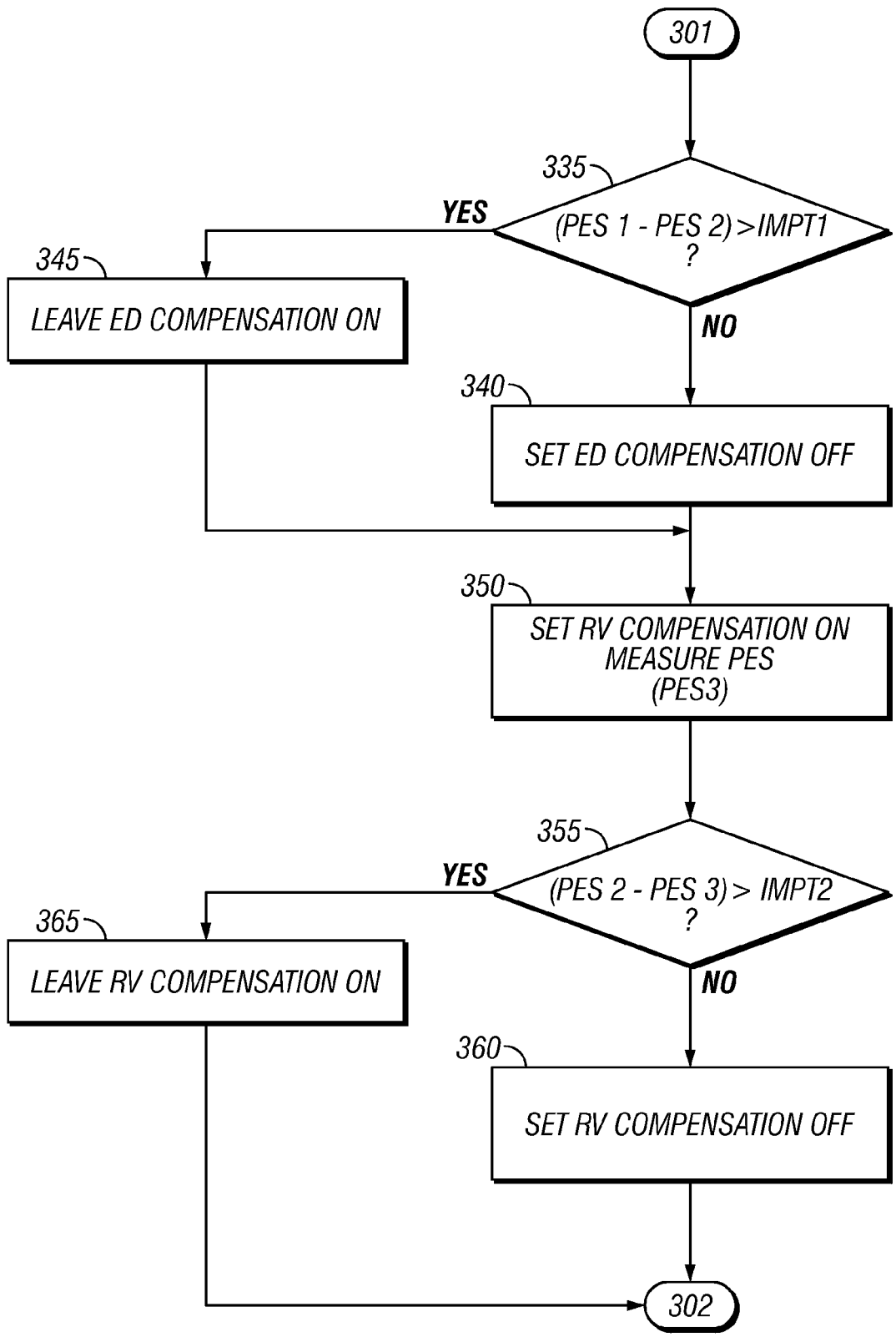

ED is a function of the input voltage V from the power supply. ED is also a function of the common mode rejection ratio (CMRR) of the sense amplifier (FIG. 4). CMRR is proportional to the ratio of a change in disturbance ED to a change in input voltage V. CMRR is a metric by which current sense amplifier 240 is characterized for rejecting a common mode voltage. Common mode gain of an amplifier enables an amplifier such as current sense amplifier 240 to detect differences between signals with small amplitudes. The common mode gain is specified for any given amplifier, but is only known once it is built and operational. The common mode gain is dependent upon the consistency of matching its components, such as the associated resistors of the sense amplifier 240 presented in the schematic of FIG. 3.

With continued reference to FIG. 3, the CMRR of sense amplifier 240 is affected by the consistency of matching the components associated with sense amplifier 240. The CMRR affects how disturbances in the voltage from the power supply and provided to transconductance ($G_m$) amplifier 192, become manifested in VCM current I. Voltage reference ($V_R$) 215 provides a reference voltage to current sensing amplifier 240 as well as error amplifier 220, power amplifier (230a, 230b). $V_R$ 215 is typically half of the voltage delivered by the power supply. Since $V_R$ 215 is electrically coupled with power supply voltage V, the performance of current sensing amplifier 240, as well as error amplifier 220, and power amplifier (230a, 230b), is affected by the disturbance ED in power supply voltage V.

The operation of ED feedforward compensation will now be explained. A first power setting V1 for power supply is presented to the servo control system. A disturbance ED1 is caused by V1 interacting with current sensing amplifier 240 coupled with $G_m$ amplifier 192. Disturbance ED1 is associated with the effect of V1 on CMRR associated with current sensing amplifier 240. This is associated with CMRR because the mechanics of the VCM are constant, therefore mechanical bias B has not changed, and the servo control loop is track following a constant reference position r. The control command, U1 for the V1 power setting is then measured.

A second power setting V2 for the power supply is presented to the servo control system. A disturbance ED2 is caused by V2 interacting with current sensing amplifier 240 coupled with $G_m$ amplifier 192. Disturbance ED2 is associated with the effect of V2 on CMRR associated with current sensing amplifier 240 for the same above-described reasons, i.e., constant mechanical bias B and constant reference position r. The control command, U2 for the V2 power setting is measured. Recalling equation (3):

$$(G_m \times (ED+U)) + B = 0, \quad (4)$$

ED can be expressed as:

$$ED = (-B/G_m) - U. \quad (5)$$

The disturbance ED is whatever bias B that is needed mechanically to stay at reference position r transformed back through the transconductance amplifier to match the control command current, but in the opposite sign. The CMRR is proportional to the differences between the two disturbances (ED1−ED2) and the differences in voltage (V1−V2) in the power supply. It is appreciated that from a control system standpoint that for the above set of conditions a signal is provided that matches the disturbance ED. Mathematically it is possible to state that $$CMRR \propto \frac{(ED1-ED2)}{(V1-V2)} \rightarrow \frac{(U1-U2)}{(V1-V2)}. \quad (6)$$

The proportionality constant for CMRR enables optimal gain compensation to be derived for the ED feedforward controller. The amplitude for the disturbance ED in the power the power supply voltage V is derived and hence is used to compute gain compensation.

In the present invention either or both of MD compensation and ED compensation can be selectively enabled and disabled. This is depicted in FIG. 2 as logic block 300 which represents computer program instructions that implement an algorithm run in microprocessor 117 of the servo control processor 115. The logic block 300 receives as input the PES and the ADC 104 output of digital voltage and provides output commands to enable/disable MD and ED compensation, as depicted in FIG. 2 by "switches" 302, 304 to the RV feedforward controller and ED feedforward controller, respectively.

FIG. 4 is a flow chart of the logic 300 representing the method of the present invention. The method may be implemented in software or firmware, and may be stored as computer program instructions in a computer-readable storage medium, such as memory 118, for execution by a computer processor, such as microprocessor 117. At block 305, RV compensation and ED compensation are both disabled (turned off). At block 310, the frequency of recent write-inhibits (WI) is measured against a write-inhibit frequency (WIF) threshold. The WIF threshold may be a predetermined number of write-inhibit flags per write commands, for example 10 percent of write commands. A WIF greater than the threshold would indicate some likely disturbance to the disk drive is causing TMR. If WIF is less than the WIF threshold the method returns to block 305. If WIF is greater than the WIF threshold the method proceeds to block 315. At block 315 an averaged ED sensor signal (averaged voltage from ADC 104) is calculated and compared to an ED threshold. The ED threshold may be determined by design criteria for the noise tolerance level of the servo system, e.g. 250 mV AC. The averaged voltage may be an actual average, a weighted power average, or any statistical type of average, such as a root-mean-square, taken over a number of digital samples from ADC 104 over the AC components of ED. If the ED is less than the ED threshold, then at block 320 RV compensation is enabled (turned on) and the method returns to block 310. If the ED is greater than the ED threshold at block 315, then at block 325, if both ED compensation and RV compensation are not already off, they are turned off. Then, with both ED compensation and RV compensation off, a first measurement of PES is made (PES1), preferably as an averaged PES over a number of samples. Then at block 330, ED compensation is turned on and with ED compensation on, a second measurement of averaged PES is made (PES2). At block 335, PES2 is compared with PES1 to determine if there has been a significant improvement in track following. As with the averaged ED, the averaged PES may be an actual average, a weighted power average, or any statistical type of average, such as a root-mean-square, taken over a number of digital samples from PES. If the averaged PES with ED compensation on (PES2) is less than the averaged PES with ED compensation off (PES1) by an amount greater than a predetermined first improvement threshold (IMPT1), this indicates that the disturbance was an ED and has been corrected by switching in the ED feedforward compensation.

IMPT1 may be selected by experiment. For example, by characterizing the transfer functions of FIG. 2 and typical measurement repeatability tolerances, margin can be applied to establish specific improvement thresholds based on the drive sensitivity to electronic disturbances. This is represented in block 335 as (PES1-PES2) being greater than the first improvement threshold IMPT1. If there is no improvement, then at block 340 ED compensation is turned off and the method proceeds to block 350. If there is an improvement then at block 345 ED compensation is kept on and the method proceeds to block 350. At block 350, RV compensation is turned on and a third measurement of averaged PES is made (PES3). PES1, PES2 and PES3 may each be an actual average, a weighted power average, or any statistical type of average, such as a root-mean-square, taken over a number of digital samples. At block 355, PES3 is compared with PES2 to determine if there has been a significant improvement in track following with RV compensation turned on. If the averaged PES with RV compensation on (PES3) is less than the averaged PES with RV compensation off (PES2) by an amount greater than a predetermined second improvement threshold (IMPT2), this indicates that the disturbance was a RV disturbance and has been corrected by switching in the RV feedforward compensation. IMPT2 may be selected by experiment. For example, by characterizing the transfer functions of FIG. 2 and typical measurement repeatability tolerances, margin can be applied to establish specific improvement thresholds based on the drive sensitivity to RV disturbances. If there is no improvement at block 355, then at block 360 RV compensation is turned off and the method proceeds to block 310 where the method continues with the comparison of WIF to a WIF threshold. If there is an improvement at block 355, then at block 365 RV compensation is kept on and the method proceeds back to block 310.

In the preferred embodiment of the method of the present invention, after it has been determined that there is some disturbance that is causing TMR (WIF greater that the WIF threshold at block 310), then the system is tested at block 315 to determine if there is an ED greater than the ED threshold. Only if there is no ED greater than the ED threshold is RV compensation turned on at block 320 and the method returns to block 310. This sequence avoids the problem of coupling of the ED disturbance into the RV sensor. Since there is no ED disturbance, the RV compensation responds to actual RV sensed by the RV sensor.

In the preferred embodiment of the method as described above, if the test of block 315 is YES then the system is tested for improvement first by ED compensation by measuring averaged PES values before and after turning ED compensation on (blocks 325, 330, 335). However, as an alternative sequence, if the test of block 315 is YES then the system can be tested for improvement first by RV compensation by measuring averaged PES values before and after turning RV compensation on. In this alternative approach, after block 315, the sequence would be blocks 325, 350, 355.

In the preferred embodiment of the method as described above, the method is initiated by periodically testing the WIF at block 310. However, the method may also be initiated on a regularly scheduled basis instead of or in addition to testing the WIF. For example, the method may be initiated as a scheduled task each time the disk drive is powered on and/or each time the disk drive enters an idle state, i.e., a period during which the HDC 110 is not processing read or write commands from the host. In such an embodiment the method would proceed from block 305 directly to block 315.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for operating a disk drive, the disk drive including (a) a rotatable magnetic recording disk having a plurality of concentric data tracks containing servo positioning information; (b) a read/write head movable across the disk, the head being capable of reading data and servo positioning information in the data tracks and writing data in the data tracks; (c) a voice-coil-motor (VCM) for moving the head; (d) a VCM driver for supplying electrical current to the VCM; (e) a power supply for powering the VCM driver; (f) an electrical disturbance (ED) sensor for detecting ED to the VCM driver; (g) a rotational vibration (RV) sensor for sensing RV of the disk drive; (h) a servo control processor responsive to a position error signal (PES) from the servo positioning information for generating a VCM control signal, the PES representing the off-track position of the head; (i) an ED feedforward controller responsive to a signal from the ED sensor for generating an ED compensation signal to be summed with the VCM control signal; and (j) a RV feedforward controller responsive to a signal from the RV sensor for generating a RV compensation signal to be summed with the VCM control signal; the processor-implemented method comprising:

determining if the PES is greater than a predetermined PES threshold, thereby indicating track misregistration (TMR);

comparing the averaged ED sensor signal to an ED threshold;

if the PES is greater than said PES threshold and said averaged ED sensor signal is not greater than said ED threshold, turning the RV compensation signal on, whereby the RV compensation responds substantially only to actual RV sensed by the RV sensor.

2. The method of claim 1 wherein the disk drive is capable of inhibiting writing by the read/write head, and wherein determining if the PES is greater than a predetermined PES threshold comprises determining if the frequency of write inhibits is greater than a write inhibit frequency threshold.

3. A method for operating a disk drive, the disk drive including (a) a rotatable magnetic recording disk having a plurality of concentric data tracks containing servo positioning information; (b) a read/write head movable across the disk, the head being capable of reading data and servo positioning information in the data tracks and writing data in the data tracks; (c) a voice-coil-motor (VCM) for moving the head; (d) a VCM driver for supplying electrical current to the VCM; (e) a power supply for powering the VCM driver; (f) an electrical disturbance (ED) sensor for detecting ED to the VCM driver; (g) a mechanical disturbance (MD) sensor for sensing MD of the disk drive; (h) a servo control processor responsive to a position error signal (PES) from the servo positioning information for generating a VCM control signal, the PES representing the off-track position of the head; (i) an ED feedforward controller responsive to a signal from the ED sensor for generating an ED compensation signal to be summed with the VCM control signal; and (j) a MD feedforward controller responsive to a signal from the MD sensor for generating a MD compensation signal to be summed with the VCM control signal; the processor-implemented method comprising:
  calculating an averaged ED sensor signal;
  comparing the averaged ED sensor signal to an ED threshold;
  if said averaged ED sensor signal is not greater than said ED threshold, turning the MD compensation signal on;
  if said averaged ED sensor signal is greater than said ED threshold, calculating a first averaged PES measurement with the ED compensation signal off and the MD compensation signal off;
  calculating a second averaged PES measurement with the ED compensation signal on and the MD compensation signal off; and
  if said second averaged PES measurement is not less than said first averaged PES measurement by an amount greater than a first PES improvement threshold, turning the ED compensation signal off.

4. The method of claim 3 further comprising:
  if said second averaged PES measurement is less than said first averaged PES measurement by an amount greater than a first PES improvement threshold, calculating a third averaged PES measurement with the MD compensation signal on and the ED compensation signal on;
  if said second averaged PES measurement is not less than said first averaged PES measurement by an amount greater than said first PES improvement threshold, calculating said third averaged PES measurement with the MD compensation signal on and the ED compensation signal off;
  if said third averaged PES measurement is less than said second averaged PES measurement by an amount greater than a second PES improvement threshold, leaving the MD compensation signal on; and
  if said third averaged PES measurement is not less than said second averaged PES measurement by an amount greater than a second PES improvement threshold, turning the MD compensation signal off.

5. The method of claim 3 wherein the MD sensor is a rotational vibration (RV) sensor.

6. The method of claim 3 wherein the ED sensor is a voltage sensor for sensing the voltage applied to the VCM driver by the power supply.

7. The method of claim 3 wherein the disk drive is capable of inhibiting writing by the read/write head, and further comprising:
  prior to calculating said averaged ED sensor signal, measuring the frequency of write inhibits; and
  calculating said averaged ED sensor signal if said measured frequency is greater than a write inhibit frequency threshold.

8. The method of claim 3 wherein each of the MD and ED feedforward controllers is implemented in analog circuitry.

9. The method of claim 3 wherein each of the MD and ED feedforward controllers comprises a program of instructions readable by the processor.

10. A magnetic recording disk drive including (a) a rotatable magnetic recording disk having a plurality of concentric data tracks containing servo positioning information; (b) a read/write head movable across the disk, the head being capable of reading data and servo positioning information in the data tracks and writing data in the data tracks; (c) a voice-coil-motor (VCM) for moving the head; (d) a VCM driver for supplying electrical current to the VCM; (e) a power supply for powering the VCM driver; (f) an electrical disturbance (ED) sensor for detecting voltage applied to the VCM driver; (g) a rotational vibration (RV) sensor for sensing rotational vibration of the disk drive; (h) a servo control processor responsive to a position error signal (PES) from the servo positioning information for generating a VCM control signal, the PES representing the off-track position of the head; and (i) a program of instructions readable by the processor for undertaking method acts comprising:
  receiving a RV sensor signal from the RV sensor, an ED sensor signal from the ED sensor, and a position error signal (PES) from the servo positioning information;
  calculating a VCM control signal from the PES;
  calculating from the RV sensor signal a RV compensation signal;
  calculating from the ED sensor signal an ED compensation signal;
  comparing the ED sensor signal to an ED threshold;
  if the ED sensor signal is greater than said ED threshold, then calculating a first averaged PES (PES1) without summing the ED compensation signal with the VCM control signal and a second averaged PES (PES2) after summing the ED compensation signal with the VCM control signal;
  comparing PES2 to PES1;
  in response to said comparison of PES2 to PES1, determining whether to sum the ED compensation signal with the VCM control signal;
  if the ED sensor signal is greater than said ED threshold, then calculating a third averaged PES (PES3) after summing the RV compensation signal with the VCM control signal;
  comparing PES3 to PES2; and
  in response to said comparison of PES3 to PES2, determining whether to sum the RV compensation signal with the VCM control signal.

11. The disk drive of claim 10 wherein the disk drive is capable of inhibiting writing by the read/write head, and wherein the program of instructions further comprises instructions for undertaking method acts of:
  prior to comparing the ED sensor signal to an ED threshold, measuring the frequency of write inhibits; and
  comparing the ED sensor signal to an ED threshold if said measured frequency is greater than a write inhibit frequency threshold.

* * * * *